United States Patent
Das et al.

(10) Patent No.: US 11,947,863 B2
(45) Date of Patent: Apr. 2, 2024

(54) INTELLIGENT AUDIO ANALYTIC APPARATUS (IAAA) AND METHOD FOR SPACE SYSTEM

(71) Applicant: Robert Bosch GmbH, Stuttgart (DE)

(72) Inventors: Samarjit Das, Sewickley, PA (US); Joseph Szurley, Upper Saint Clair, PA (US)

(73) Assignee: Robert Bosch GmbH, Stuttgart (DE)

( * ) Notice: Subject to any disclaimer, the term of this patent is extended or adjusted under 35 U.S.C. 154(b) by 368 days.

(21) Appl. No.: 16/976,540

(22) PCT Filed: Feb. 26, 2019

(86) PCT No.: PCT/EP2019/054660
§ 371 (c)(1),
(2) Date: Aug. 28, 2020

(87) PCT Pub. No.: WO2019/166397
PCT Pub. Date: Sep. 6, 2019

(65) Prior Publication Data
US 2020/0409653 A1  Dec. 31, 2020

Related U.S. Application Data

(60) Provisional application No. 62/636,498, filed on Feb. 28, 2018.

(51) Int. Cl.
*G06F 17/00* (2019.01)
*G05B 23/02* (2006.01)
(Continued)

(52) U.S. Cl.
CPC ......... *G06F 3/165* (2013.01); *G05B 23/0229* (2013.01); *G06N 3/08* (2013.01); *G06Q 10/20* (2013.01)

(58) Field of Classification Search
CPC ...... G06F 3/165; G05B 23/0229; G06N 3/08; G06Q 10/20
(Continued)

(56) References Cited

U.S. PATENT DOCUMENTS 8,484,022 B1 * 7/2013 Vanhoucke .......... G06N 3/0454
700/48
2006/0122810 A1   6/2006 Clarke et al.
(Continued)

FOREIGN PATENT DOCUMENTS

CN   101753992 A   6/2010
CN   105372087 A   3/2016
(Continued)

OTHER PUBLICATIONS

Marche, Deep Recurrent Neural Network-Based Autoencoders for Acoustic Novelty Detection (Year: 2017).*
(Continued)

*Primary Examiner* — Paul C McCord
(74) *Attorney, Agent, or Firm* — Maginot, Moore & Beck LLP (57) ABSTRACT

An intelligent audio analytic apparatus (IAAA) and method for space system. The IAAA comprises a processor, a computer readable medium, and a communication module. The instructions include audio data processing algorithms configured to identify and predict impending anomalies associated with the space system using at least one neural network.

12 Claims, 6 Drawing Sheets

(51) Int. Cl.
*G06F 3/16* (2006.01)
*G06N 3/08* (2023.01)
*G06Q 10/20* (2023.01)

(58) Field of Classification Search
USPC .......................................................... 700/94
See application file for complete search history.

(56) References Cited

U.S. PATENT DOCUMENTS

| | | | |
|---|---|---|---|
| 2013/0030765 A1* | 1/2013 | David | G05B 23/024 702/183 |
| 2018/0275642 A1* | 9/2018 | Tajima | G06N 3/044 |
| 2019/0050979 A1* | 2/2019 | Park | G06V 10/764 |
| 2019/0123931 A1* | 4/2019 | Schuster | G05B 13/0265 |
| 2019/0334784 A1* | 10/2019 | Kvernvik | H04W 24/08 |
| 2020/0371491 A1* | 11/2020 | Wong | G05B 13/027 |

FOREIGN PATENT DOCUMENTS

| | | |
|---|---|---|
| CN | 107066759 A | 8/2017 |
| CN | 107458383 A | 12/2017 |
| CN | 107643712 A | 1/2018 |
| EP | 2 538 034 A2 | 12/2012 |
| JP | 201949778 * | 7/2017 |

OTHER PUBLICATIONS

Aytekin: Clustering and Unsupervised Anomaly Detection with 12 Normalized Deep Auto-Encoder Representations (Year: 2018).*
Marchi, Deep Recurrent Neural Network-Based Autoencoders for Acoustic Novelty Detection, 2017 (Year: 2017).*
International Search Report corresponding to PCT Application No. PCT/EP2019/054660, dated May 16, 2019 (4 pages).

* cited by examiner

Fig. 6

INTELLIGENT AUDIO ANALYTIC APPARATUS (IAAA) AND METHOD FOR SPACE SYSTEM

CROSS-REFERENCE TO RELATED APPLICATIONS

This application is a 35 U.S.C. § 371 National Stage Application of PCT/EP2019/054660, filed on Feb. 26, 2019, which claims priority to U.S. Provisional Application Ser. No. 62/636,498, filed on Feb. 28, 2018, the disclosures of which is hereby are incorporated herein by reference in its their entirety.

TECHNICAL FIELD

This disclosure relates generally to audio system and, more particularly, to intelligent audio analytic apparatus (IAAA) and method for space system.

BACKGROUND

Unless otherwise indicated herein, the materials described in this section are not prior art to the claims in this application and are not admitted to the prior art by inclusion in this section.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the disclosure related to an intelligent audio analytic apparatus (IAAA) and method for space system. The IAAA comprises a processor, a computer readable medium, and a communication module. Instructions stored on the computer readable medium include audio data processing algorithms configured to identify and predict impending anomalies associated with the space system using at least one neural network.

BRIEF DESCRIPTION OF THE DRAWINGS

These and other features, aspects, and advantages of this disclosure will become better understood when the following detailed description of certain exemplary embodiments is read with reference to the accompanying drawings in which like characters represent like arts throughout the drawings, wherein.

DETAILED DESCRIPTION

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to a person of ordinary skill in the art to which this disclosure pertains.

Figure 1:
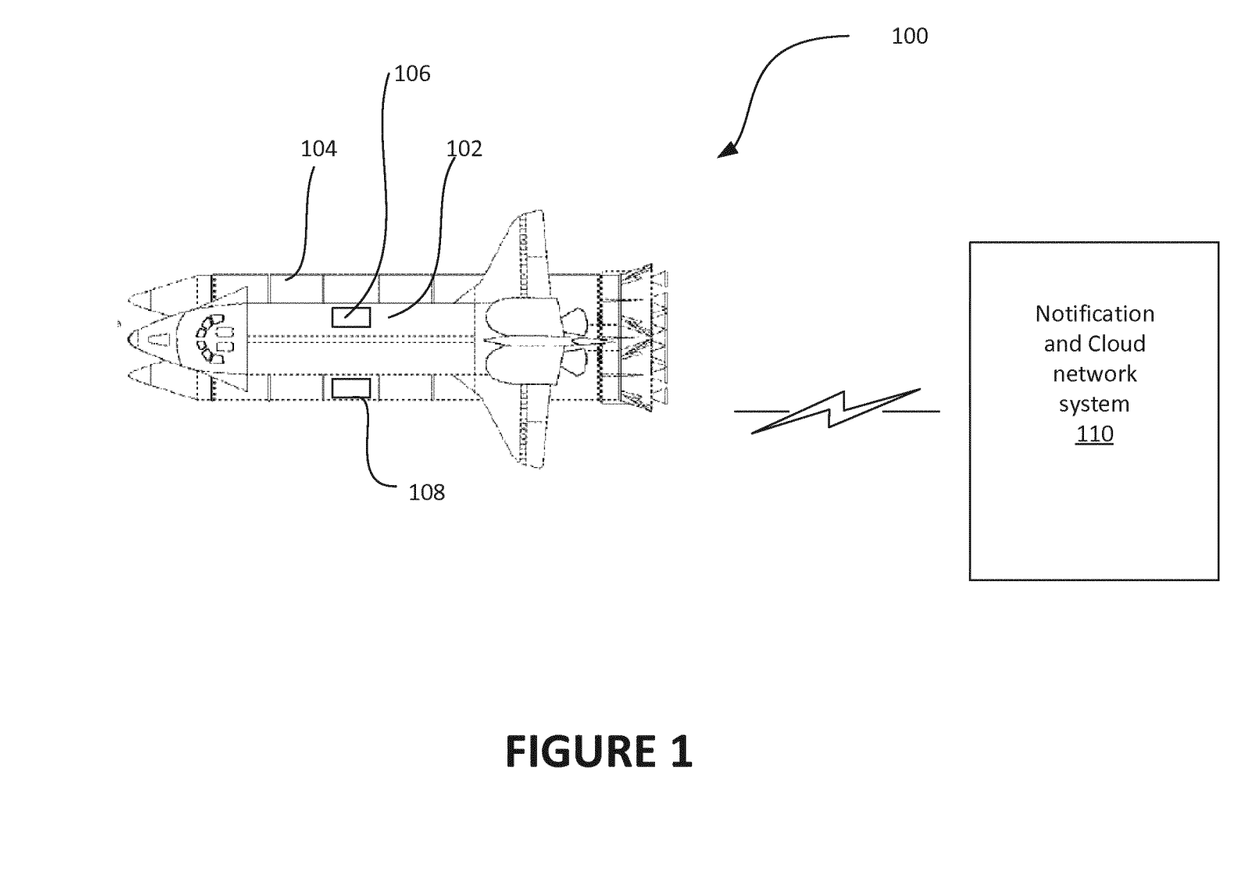
FIG. 1 is a simplified block diagram of a space system according to a described embodiment of a disclosure.

FIG. 1 a simplified block diagram of a space system 100 according to a described embodiment of a disclosure. The system 100 comprises a space shuttle 102 and a booster 104 coupled to an underside of the space shuttle 102. IAAA 106, 108 comprises an audio data processing algorithms configured to identify and predict impending anomalies associated with the space system 100. The IAAA 106, 108 may be located throughout the space shuttle 102, the booster 104, or combination thereof. The function performed by the IAAA 106, 108 allows for both erroneous machine operation and deteriorating machine health or condition to be categorized facilitating preventive or corrective measures thereby reducing maintenance costs and limiting the downtime of the system. The IAAA 106, 108 analyzes the temporal dynamics in the audio/vibration data and utilizes state-of-the-art machine learning algorithms for time-series anomaly detection and prediction. Once the information is detected, the detected information is communicatively transmitted to a station comprises a notification and cloud network system 110.

Figure 2:
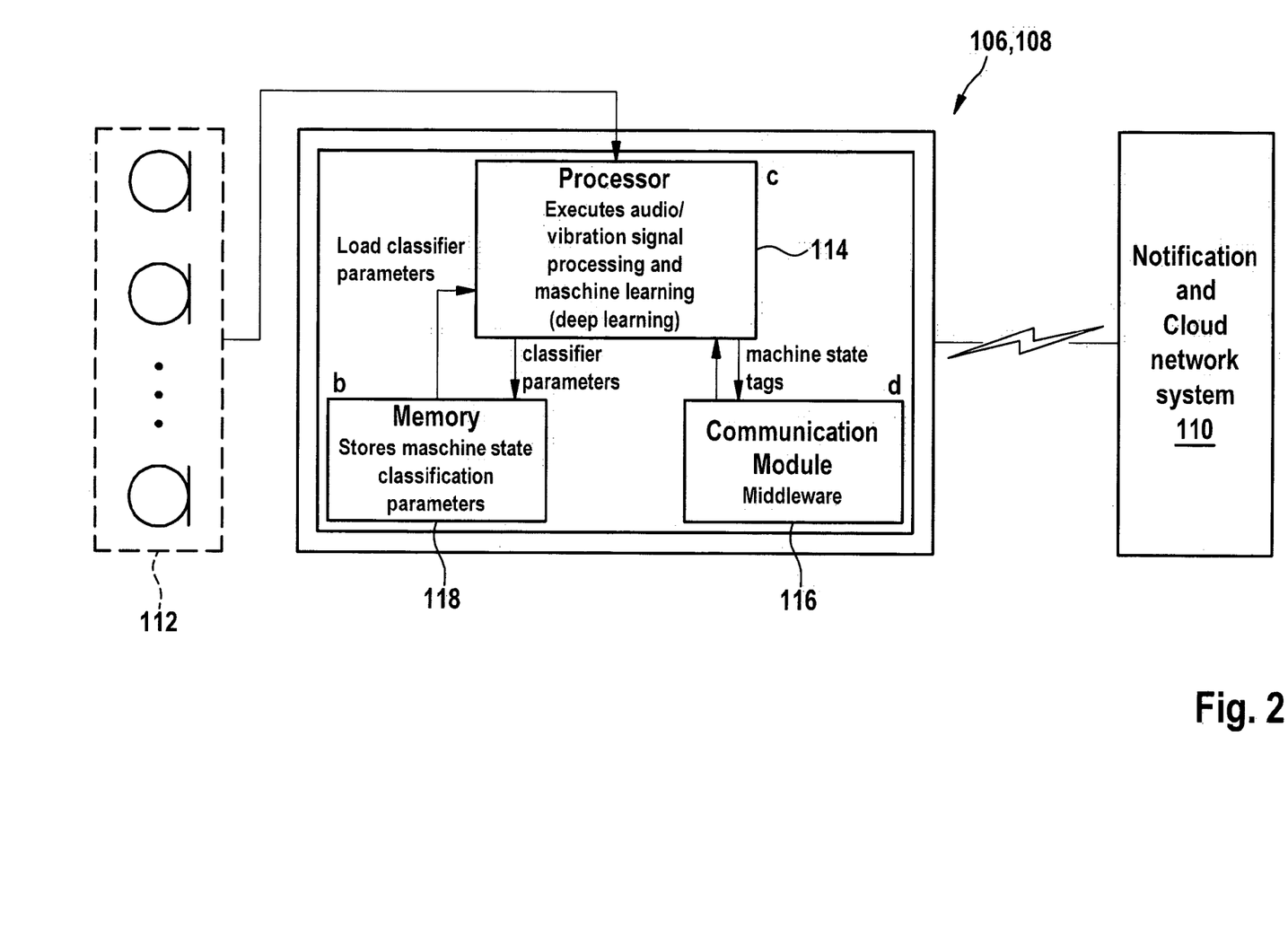
FIG. 2 is a simplified block diagram of an intelligent audio analytic apparatus (IAAA) according to a described embodiment of the disclosure.

FIG. 2 is a simplified block diagram of the IAAA 106 or 108 according to a described embodiment of the disclosure. The IAAA 106, 108 is communicatively coupled to an audio input array 112. In one embodiment, the audio input array 112 may include a plurality of microphone, a plurality of receiver, or any suitable acoustic transducers. In another embodiment, the audio input array 112 may include other non-audio input such as a vibration sensor, an accelerometer, a motion sensor, or any suitable sensing units. In order to collect training data for the machine learning algorithms, the audio input array 112 is mounted on or in the vicinity of the system 100 under test (DUT). The audio input array 112 detects the signals and the detected signals is then preprocessed to remove any competing environmental or ambient noise, and so forth. In one embodiment, the preprocessing function can be performed by the audio input array 112. In some embodiments, the preprocessing function can be performed by a preprocessor either disposed in the audio input array 112 to form part of the audio input array 112 or located outside the audio input array 112 and is communicatively coupled to the audio input array 112. If the preprocessor is located outside the audio input array 112, the preprocessor can be carried by the IAAA 106, 108 to form a portion of the IAAA 106, 108. Alternatively, the preprocessor can be an independent computer module. The audio input array 112 not only is capable of capturing audio signal, the audio input array 112 is also capable of capturing vibration signal using the audio inputs or other non-acoustic transducers. Once the audio and/or vibration signal is captured, the IAAA 106 108 estimates operating states of the system 100 to determine if the system 100 is normal and anomalous. The capabilities to monitor/track operational state of the system 100 reveal how the system 100 reacts to introduction of different types of atmosphere, pressure, and so forth. Within the IAAA 106, 108, a processor 114, a memory 118, and a communication module 116 are provided. Depending on the requirement of the applications, other computer modules such as user interfaces, or any suitable modules may be included in the IAAA 106, 108. An audio analytics algorithm is installed in the processor 114 for execution. Further detailed description of the audio analytics algorithm will be provided below. The processor 114 receives the classification parameters for audio based system state estimation from the memory 118 as well as real-time audio and/or vibration stream from the system 100 via the audio input array 112 and output the inferred system states such as specific impact on operation state of the system. The estimated system states or anomalies are then passed on to the communication module 116 which in turn is transmitted to an external device for further statistical analysis.

Once the impact of load distribution/characteristics are traced for the system 100, the external device such as a notification and cloud computing network system 110 communicatively coupled to the IAAA 106, 108 can further perform large-scale spatio-temporal analysis of load distribution impacts on the system 100 by aggregating results from various locations including each instance and or location by utilizing an audio analytics based system state monitoring algorithm. The notification and cloud computing network system 110, in some embodiments, comprises a cloud computing module and notification tool as two separate modules disposed in the notification and cloud computing network system 110. In alternate embodiment, the cloud computing module may be located in a cloud network external to the notification and cloud computing network system 110. In yet another embodiment, the cloud computing module is also the cloud network. A visualization tool such as a program or an app may be installed on a computer machine with a display for displaying the state of the ongoing power distribution process or state of the system 100 to a user. The computer machine communicatively coupled to the cloud computing module may be a desktop computer, a portable computer, a laptop, a tablet, a wearable device, or any suitable computer machines. A notification system such as a tool, a program, or an app is used to notify appropriate personnel such as a facility manager in case the IAAA 106, 108 detects anomalous machines states in the system 100. The notification system may be run on any suitable computer machines. The notification may be in the form a text message, an electronic mail, a voice mail, an audible sound, a display, an indicator, or any suitable forms of notification depending on the requirement of the application. In some embodiment, any of the notification system, the visualizations tool, and the cloud computing module may be run on either a single computer machine, multiple machines, a network, a server or combination thereof. In some embodiment, the notification system, the visualizations tool, and the cloud computing module may be installed in the same site, different site, or multiple sites.

Figure 3:
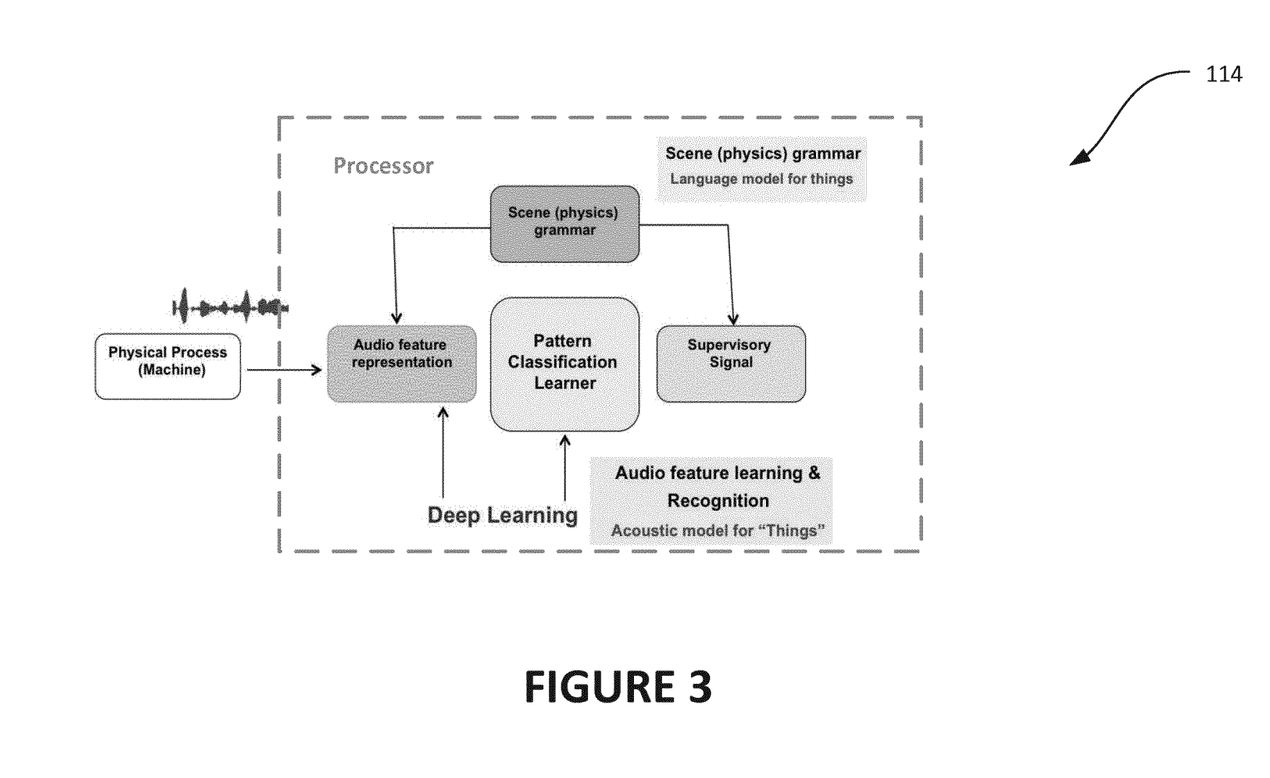
FIG. 3 is a simplified block diagram of an intelligent processor module according to a described embodiment of the disclosure.

FIG. 3 is a simplified block diagram of an intelligent processor module 114 according to a described embodiment of the disclosure. The intelligent processor module 114, in one embodiment, is disposed in the IAAA 106, 108 of FIG. 2. In some embodiments, the intelligent processor module 114 may be a separate and independent module and is communicatively coupled to the audio input array 112 and the IAAA 106, 108. An audio analytics algorithm is installed and powered by the audio signal processing for audio feature representation and machine learning capabilities. The signal processing and machine learning algorithms behind the aforementioned audio analytics capabilities are largely agnostic to particular sensing modality and thus, can be adapted for any of the available time-series signals e.g., gyroscope, magnetometer, current, impedance and capacitance depending on application scenarios with the system 100. In fact, extending the algorithms to incorporate multimodal sensory fusion will enable deeper, perhaps hidden, dependencies and correlations to be exploited and thus improve upon the prediction and detection of anomalies. As depicted in the figure, the processor 114 includes several computer executable programs or functions such as scene grammar, pattern classification learner, supervisory signal, and audio feature representation. The processor 114 may also include deep learning, audio feature learning and recognition features or program. Depending on the requirement of the applications, other computer executable programs or instructions may be installed in and run by the processor 114.

Figure 4:
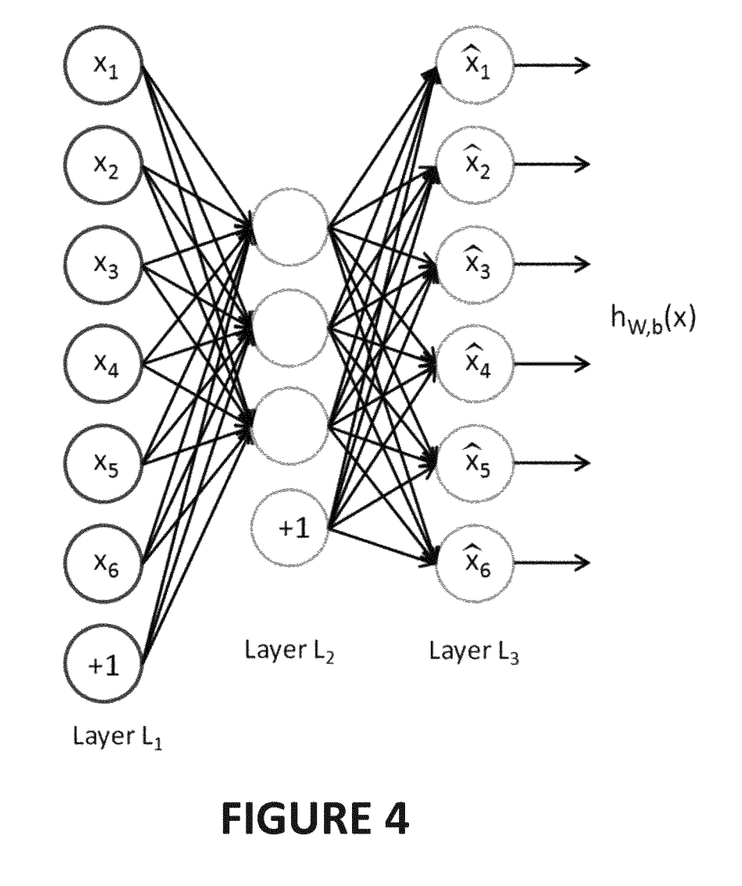
FIG. 4 is a simplified auto-encoder network architecture according to a described embodiment of the disclosure.

FIG. 4 is a simplified auto-encoder network architecture according to a described embodiment of the disclosure. For anomaly detection, an auto encoder (AE) and several of its derivatives such de-noising AE, deep AE, just to name a few can be used. The AE relies on a low dimensional latent representation of the signal subspace, which, when reconstructed and coupled with an error threshold, can differentiate between normal and anomalous data, i.e., anomalies tend to have larger reconstruction error. The aforementioned derivatives of the AE improve the performance of the standard AE by adding robustness and exploiting a deeper structure that may be present in the data. As depicted in the figure, a first layer L1 corresponds to the input signal (e.g. FFT of audio/vibration signals from the power distribution machines) and a third layer L3 is the reconstructed version of the signal. A second layer L2 is the low dimensional latent representation. The encoder can be trained with machine data wherein anomalous operations are assumed to be sparse over time. The reconstruction error at the third layer L3 will be large for those outlier signals. This error magnitude can be used as a cue for anomaly detection.

Figure 5:
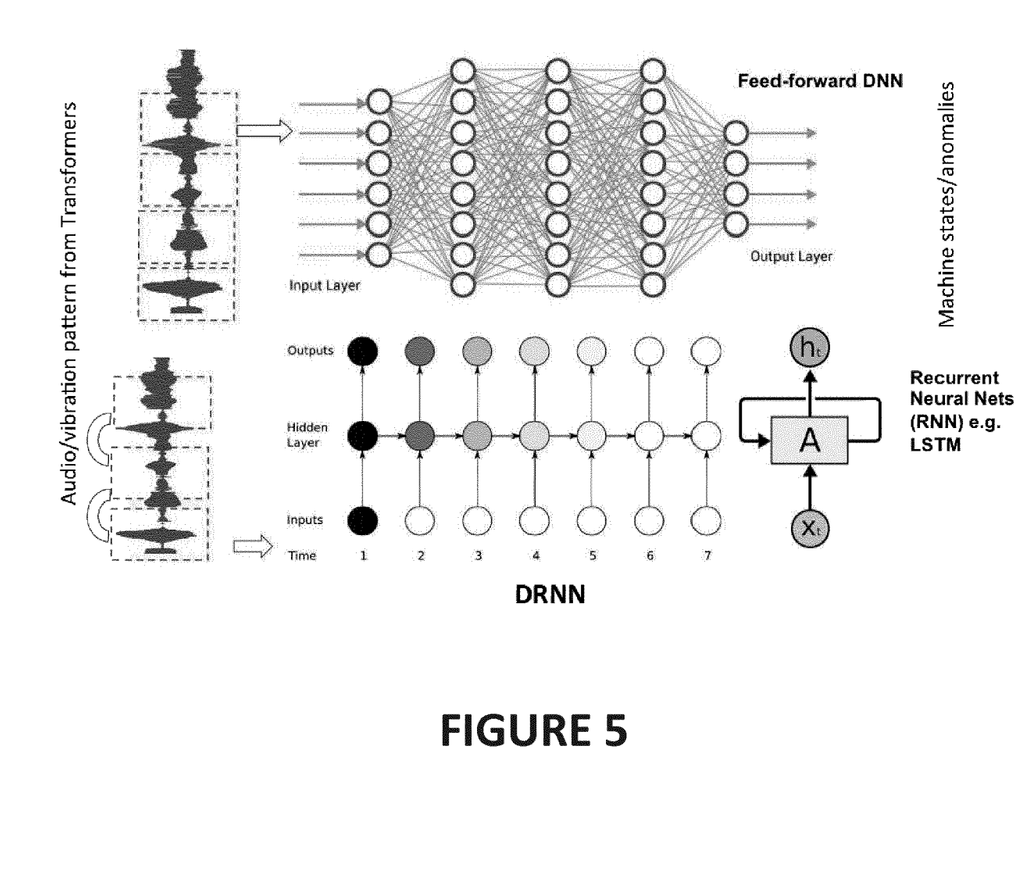
FIG. 5 is a diagram of a deep recurrent neural network (DRNN) that receives vectors of audio states according to a described embodiment of the disclosure.

FIG. 5 is a diagram of a deep recurrent neural network (DRNN) that receives vectors of audio states according to a described embodiment of the disclosure. Unlike from AE where only the frame, or instantaneous, difference between the current data and the known classifiers/anomalies are exploited. Further, AE does not retain any temporal information that may be used to predict the underlying structure that lead to the anomaly. To fully exploit temporal knowledge to assist as preventative maintenance, Deep Recurrent Neural Networks (DRNNs) is one of an approach to predict when possible anomalies will occur based on deep learning.

DRNN is capable of modeling the temporal dynamics of audio patterns as compared to frame-based approaches wherein each frame is associated with a label (e.g. normal vs. abnormal) without taking the temporal context/variations into account. However, training a DRNN on machine operation time series data involves annotation of the collected audio patterns into different operation modes beforehand. With those annotated data, DRNN can learn salient audio patterns associated normal power distribution operation as well as detect when it deviates into anomalies by identifying the failure modes (e.g. specific transformer unit malfunctioning). DRNN executed by the IAAA 106, 108 not only shows remarkable ability to model audio signals associated with human speech, the IAAA 106, 108 is also capable of performing monitoring and anomaly detection/prediction.

Figure 6:
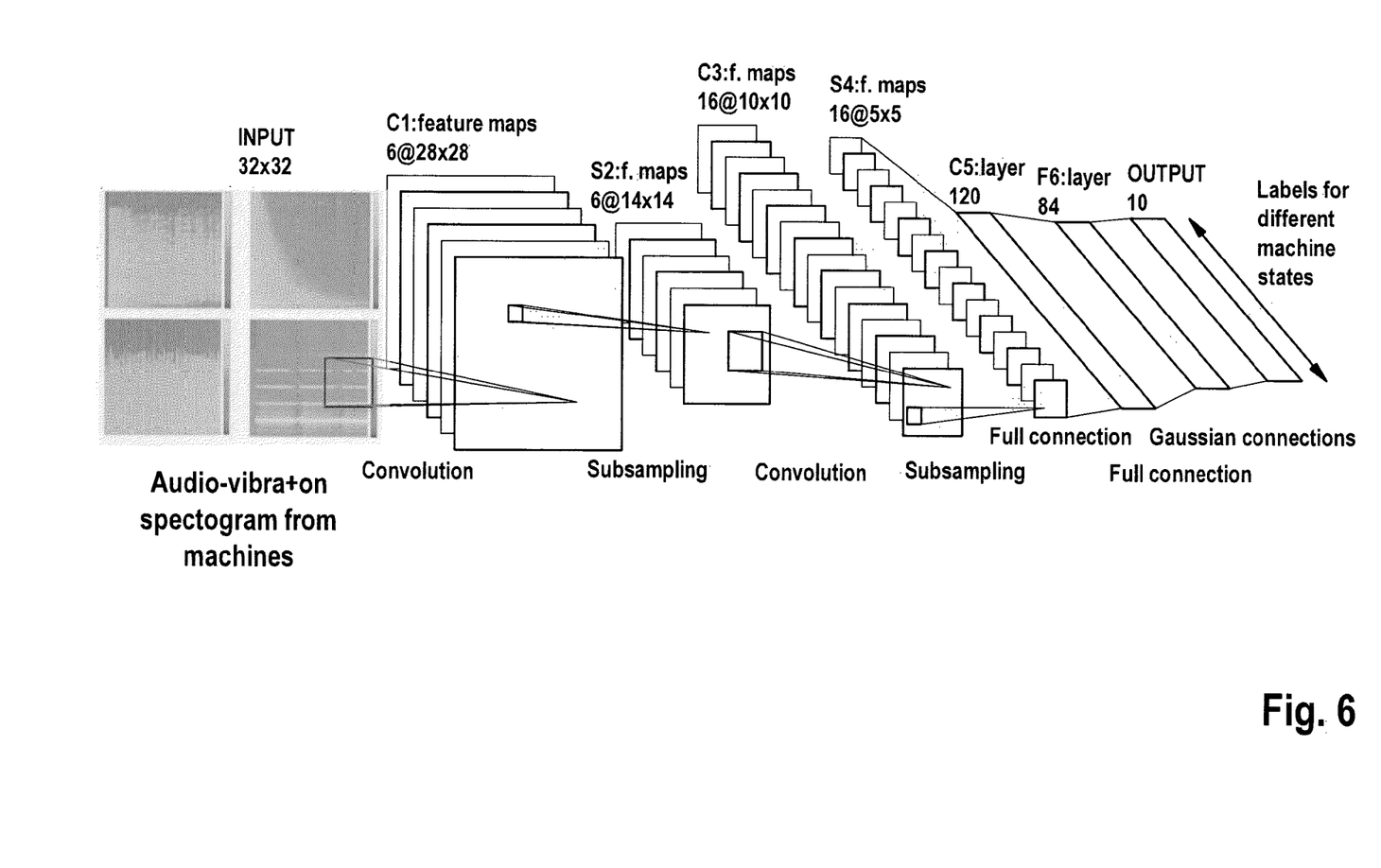
FIG. 6 is a diagram of a deep convolutional neural network (CNN) for continuous monitoring of machine operation states according to a described embodiment of the disclosure.

FIG. 6 is a diagram of a deep convolutional neural network (CNN) for continuous monitoring of machine operation states according to a described embodiment of the disclosure. The deep CNNs for continuous monitoring of machine operating states may be installed on the IAAA 106, 108 to perform anomaly detection. The deep CNNs further facilitate statistical analysis in the cloud network for data mining and optimizing machine operations. The CNN based analysis applies to audio/vibrations associated with the system 100. In some embodiments, the CNNs can be used in a supervised learning framework. For example, first, time-stamped data can be collected for different machine states and the corresponding temporal audio-vibration segments can be transformed into spectrograms for further analysis. The spectrograms are henceforth be treated as natural 2D images and fed through a VGG Network (very deep CNNs designed for image recognition) to recognize a particular machine state. An overview of the deep CNN architecture is provided in the figure that is executed by the IAAA 106, 108.

The embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling with the sprit and scope of this disclosure.

Embodiments within the scope of the disclosure may also include non-transitory computer-readable storage media or machine-readable medium for carrying or having computer-executable instructions or data structures stored thereon. Such non-transitory computer-readable storage media or machine-readable medium may be any available media that can be accessed by a general purpose or special purpose computer. By way of example, and not limitation, such non-transitory computer-readable storage media or machine-readable medium can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above should also be included within the scope of the non-transitory computer-readable storage media or machine-readable medium.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

While the patent has been described with reference to various embodiments, it will be understood that these embodiments are illustrative and that the scope of the disclosure is not limited to them. Many variations, modifications, additions, and improvements are possible. More generally, embodiments in accordance with the patent have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A space system equipment monitoring system comprising:
a plurality of sensing assemblies, each sensing assembly being configured for incorporation in, onto or proximate a respective space system equipment of a plurality of space system equipment arranged at various different locations, each of the plurality of sensing assemblies being configured to output sensor signals indicative of sounds and/or vibrations from the respective space system equipment; and
an intelligent audio analytic (IAA) device configured to receive the sensor signals from the plurality of sensing assemblies, to process the sensor signals to detect anomalies from operation of the plurality of space system equipment, and to output detection information to an output device to alert an operator of detection of any anomalies, the IAA device including programmed instructions stored on a non-transitory computer readable storage medium and a processor configured to execute the programmed instructions, the programmed instructions including an analytics algorithm for execution by the processor to continuously process the sensor signals to detect the anomalies,
wherein the analytics algorithm includes an autoencoder neural network, the autoencoder network being configured to receive the respective sensor signals as input and to output respective reconstructed sensor signals based on the input,
wherein the processor is configured to (i) generate respective reconstruction error signals that are indicative of a difference between the input and the output of the autoencoder neural network for the respective sensor signals, (ii) detect anomalies based on a magnitude of each respective reconstruction error signal, and (iii) perform spatio-temporal analysis of load distribution impacts on the plurality of space system equipment by aggregating results from the plurality of space system equipment arranged at the various different locations.

2. The system of claim 1, wherein the sensor signals are preprocessed before being supplied as inputs to the autoencoder neural network.

3. The system of claim 1, wherein the processor is configured to compare the magnitude of the error signal with an error threshold and to detect anomalies when the magnitude of the error signal exceeds the error threshold.

4. The system of claim 2, wherein the analytics algorithm further includes a deep recurrent neural network (DRNN), the DRNN being configured to receive the sensor signals as inputs and to detect audio and/or vibration patterns in the sensor signals indicative of the anomalies.

5. The system of claim 2, wherein the analytics algorithm further includes a deep convolutional neural network (CNN), the CNN being configured to receive the sensor signals as inputs and to detect audio and/or vibration patterns in the sensor signals indicative of the anomalies.

6. The system of claim 5, wherein the sensor signals are transformed into spectrograms during preprocessing, the spectrograms being supplied as inputs to the deep CNN, and wherein the deep CNN is configured to process the spectrograms to identify the anomalies.

7. A method for monitoring power distribution equipment, comprising:
generating respective sensor signals indicative of sounds and/or vibrations originating from a respective space system equipment of a plurality of space system equipment arranged at various different locations, the respective sensor signals being detected by a plurality of sensing assemblies located on, in or proximate the plurality of space system equipment;
processing the respective sensor signals to detect anomalies from operation of the respective space system equipment using a processor of an intelligent audio analytic (IAA) device, the processor being configured to process the respective sensor signals according to an analytics algorithm to detect the anomalies, the analytics algorithm including an autoencoder neural network configured to detect errors and/or patterns in the respective sensor signals indicative of the anomalies; and
outputting detection information to an output device when an anomaly is detected,
wherein the autoencoder network is configured to receive the respective sensor signals as input and to output respective reconstructed sensor signals based on the input,
wherein the processor is configured to (i) generate respective reconstruction error signals that are indicative of a difference between the input and the output of the autoencoder neural network for the respective sensor signals, (ii) detect anomalies based on a magnitude of each respective reconstruction error signal, and (iii) perform spatio-temporal analysis of load distribution impacts on the plurality of space system equipment by aggregating results from the plurality of space system equipment arranged at the various different locations.

8. The method of claim 7, wherein the sensor signals are preprocessed before being supplied as inputs to the autoencoder neural network.

9. The method of claim 6, wherein the processor is configured to compare the magnitude of the error signal with an error threshold and to detect anomalies when the magnitude of the error signal exceeds the error threshold.

10. The method of claim 8, wherein the analytics algorithm further includes a deep recurrent neural network (DRNN), the DRNN being configured to receive the sensor signals as inputs and to detect audio and/or vibration patterns in the sensor signals indicative of the anomalies.

11. The method of claim 8, wherein the analytics algorithm further includes a deep convolutional neural network (CNN), the CNN being configured to receive the sensor signals as inputs and to detect audio and/or vibration patterns in the sensor signals indicative of the anomalies.

12. The method of claim 11, wherein the sensor signals are transformed into spectrograms during preprocessing, the spectrograms being supplied as inputs to the deep CNN, and
wherein the deep CNN is configured to process the spectrograms to identify the anomalies.

* * * * *